(12) United States Patent
Ristock et al.

(10) Patent No.: US 9,195,956 B2
(45) Date of Patent: *Nov. 24, 2015

(54) FEDERATED UPTAKE THROTTLING

(71) Applicant: Genesys Telecommunications Laboratories, Inc., Daly City, CA (US)

(72) Inventors: Herbert Willi Artur Ristock, Walnut Creek, CA (US); Brian Galvin, Seabeck, WA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/477,799

(22) Filed: Sep. 4, 2014

(65) Prior Publication Data
US 2014/0379416 A1   Dec. 25, 2014

Related U.S. Application Data

(63) Continuation of application No. 11/967,485, filed on Dec. 31, 2007, now Pat. No. 8,904,031.

(51) Int. Cl.
*G06F 15/16* (2006.01)
*G06Q 10/06* (2012.01)
*G06F 17/30* (2006.01)
*G06Q 10/10* (2012.01)

(52) U.S. Cl.
CPC ...... *G06Q 10/0633* (2013.01); *G06F 17/30566* (2013.01); *G06F 17/30899* (2013.01); *G06Q 10/10* (2013.01); *G06Q 10/107* (2013.01)

(58) Field of Classification Search
CPC ......... H04L 47/10; H04L 69/16; H04L 43/06; G06Q 50/10; G06Q 10/06375
See application file for complete search history.

(56) References Cited

U.S. PATENT DOCUMENTS

| 5,381,413 A | 1/1995 | Tobagi et al. |
| 6,119,109 A | 9/2000 | Muratani et al. |
| 6,961,341 B1 | 11/2005 | Krishnan |

(Continued)

FOREIGN PATENT DOCUMENTS

EP    1672555 A1    6/2006

OTHER PUBLICATIONS

Bhide, M. et al., "Adaptive Push-Pull: Disseminating Dynamic Web Data", IEEE Transaction on Computers, vol. 51, No. 6, Jun. 2002, 18 pages.

(Continued)

*Primary Examiner* — Djenane Bayard
(74) *Attorney, Agent, or Firm* — Christie, Parker & Hale, LLP

(57) ABSTRACT

In a first enterprise joined in a distributed, federated network of second enterprises, a system is provided for managing data flow between enterprises, the system including a data management server in the first enterprise having access to sets of rules for managing data flow to and from the first enterprise, a first data interface in the first enterprise dedicated to data transfer to a paired second dedicated data interface at a neighboring second enterprise in the federation, wherein the first data interface manages data sent to the second interface and/or data incoming from the second interface according to the sets of rules for managing data flow.

20 Claims, 10 Drawing Sheets

(56) References Cited

U.S. PATENT DOCUMENTS

| | | | |
|---|---|---|---|
| 7,315,513 | B2 | 1/2008 | McCann et al. |
| 7,551,623 | B1 | 6/2009 | Feroz et al. |
| 7,562,382 | B2 | 7/2009 | Hinton et al. |
| 2003/0191853 | A1 | 10/2003 | Ono |
| 2005/0108422 | A1* | 5/2005 | Krishnan ................ 709/233 |
| 2006/0021010 | A1 | 1/2006 | Atkins et al. |
| 2006/0021017 | A1 | 1/2006 | Hinton et al. |
| 2006/0136990 | A1 | 6/2006 | Hinton et al. |
| 2006/0230124 | A1 | 10/2006 | Belfiore et al. |
| 2007/0064711 | A1* | 3/2007 | Wang et al. ............ 370/395.4 |
| 2008/0082434 | A1 | 4/2008 | Qian et al. |
| 2008/0082541 | A1 | 4/2008 | Davidson et al. |
| 2008/0109301 | A1 | 5/2008 | Yee et al. |
| 2009/0070456 | A1 | 3/2009 | Brown et al. |
| 2009/0077251 | A1 | 3/2009 | Brown et al. |
| 2009/0092050 | A1 | 4/2009 | Buch et al. |
| 2009/0147787 | A1 | 6/2009 | Arulambalam et al. |
| 2009/0171969 | A1 | 7/2009 | Ristock et al. |
| 2009/0172025 | A1 | 7/2009 | Ristock et al. |

OTHER PUBLICATIONS

Chinese Office Action dated Nov. 23, 2012, with English translation, for Application No. 200880123461.0, 8 pages.
Chinese Office action dated Jan. 20, 2014 for Application No. 200880123459.3, with English translation, 16 pages.
Chinese Office action dated Apr. 15, 2013 for Application No. 200880123459.3, with English Translation, 7 pages.
Chinese Office action dated Aug. 23, 2012 for Application No. 200880123459.3, with English Translation, 6 pages.
Chinese Office action dated Nov. 16, 2011 for Application No. 200880123459.3, with English Translation, 7 pages.
Chinese Office action dated Jul. 2, 2014 for Application No. 200880123461.0, 4 pages.
European Office action dated Sep. 17, 2013 for Application No. 08869406.2, 5 pages.
European Office action dated Aug. 16, 2012 for Application No. 08869406.2, 5 pages.
Huang, Y.W. et al., "A Bandwidth-Sensitive Update Scheduling Method for Internet Push", Distributed Computing Systems, Proceedings. 18th International Conference on Amsterdam, Netherlands, 1998, 8 pages.
Office action for European patent application No. 08869716.4 mailed by the EPO on Jan. 14, 2014, 6 pages.
Supplementary European Search Report for European patent application No. 08869716.4 mailed by the EPO on Dec. 13, 2013, 2 pages.
Unknown author, "Bandwidth throttling", Wikipedia, the free encyclopedia, retrieved from en.wikipedia.org on Nov. 29, 2013, 2 pages.

* cited by examiner

FEDERATED UPTAKE THROTTLING

CROSS-REFERENCE TO RELATED APPLICATIONS

This application is a continuation of U.S. patent application Ser. No. 11/967,485, filed on Dec. 31, 2007, issued as U.S. Pat. No. 8,904,031, the disclosure of which is hereby incorporated by reference in its entirety.

BACKGROUND OF THE INVENTION

1. Field of the Invention

The present invention is in the field of work and data sharing, and pertains particularly to federation between business enterprises.

2. Discussion of the State of the Art

At the time of the present patent application federation is becoming more common in certain business communications, such as instant messaging. Federation allows members of more than one enterprise to share information with one another, usually to a limited extent, and often, as in the case of instant messaging, to monitor contact presence across enterprise boundaries.

Typically, federated systems are set up explicitly, and are limited in scope. For example, members of various enterprises who may jointly participate in a relatively complex project may wish to share information about the project with one another using some common communications program, such as Microsoft Office Communicator. In such a federated project specific members of each enterprise may grant one another permission to "see" each other (presence), and they may agree on who gets to share what information, for example certain members may be limited to information from a designated shared folder.

It is not common in federation at the time of this application that such relationships may enjoy any sort of transitivity. That is, if one member grants another permission to monitor her presence, she is not granting permission for others to monitor her presence, and in fact the software will not permit it. Each person, or an administrator acting on behalf of a group of people within the administrator's enterprise, explicitly establishes each one-to-one sharing relationship.

Such control is crucial in normal business communications, and is also quite common in consumer communications, since privileges granted to a particular person are in general not assumed to be transferable. In fact, one can generally say that in the art, federated enterprise architectures are tightly controlled for sharing specific data or functionality according to specific rules among a group of predefined contacts in member enterprises. Generally there is either a centralized federation server that stores a single centralized configuration database for all federated aspects (in the case of process integration across enterprise boundaries), or a set of local rules for establishing specific access rights of individuals or groups in each enterprise for a specific function (in the case of, for example, instant messaging or collaboration federation).

The present inventors are aware of circumstances where something much more robust than the known architecture of federation is needed. For example, in customer service, such as in contact center situations, it is now common for large enterprises to outsource some or all of their simpler customer contacts while retaining control of more complex contacts. Furthermore, it is often the case that a contact that starts with a customer or client in one enterprise might require transfer to a second enterprise or even a third enterprise before the customer's needs are met.

As an example of unmet need in the art, in many cases mobile phone insurance is provided by specialized insurance providers on behalf of mobile carriers. When a consumer has lost a mobile phone, they often have a single number to call, which is printed on their bill. When they call that number, they are likely to be speaking to a customer service representative (CSR) from the insurance company, even though the CSR may answer the phone as if he worked for the mobile phone company. The insurance CSR can handle the lost phone report, can verify if the phone has been used since its last known use by its proper owner, and arrange for shipment of a new phone (and collection of any charges due for these services). But the insurance company CSR is unlikely to be able to be able to answer questions about changing the mobile phone contract, which need might commonly arise in such a situation. In this case, the call would need to be transferred to a CSR who works for the mobile phone company. Quite often consumers in such situations are simply given a new number to call, or they are cold transferred to the phone company's contact center with no attached data indicating what has taken place between the consumer and the insurance company CSR. In this well-known case, the consumer finds herself repeating much of what was said before.

The previous example gets even more complex when outsourcers are factored in. It may well be that the phone company sends calls transferred from the insurance company to an outsourced contact center over which it has little control. Moreover, as the outsourcing industry matures in countries like India, it is more common for outsourcers to themselves outsource some portion of their own traffic to yet smaller outsourcers. Larger outsourcers in principle centers such as Bangalore or Mumbai enjoy strong relationships with their client base, but suffer from increased labor costs as the rapid development of their home regions causes skilled labor shortages and wage increases. Such large outsourcers are tapping into emerging outsourcing hubs such as university towns like Pune, or other English-speaking countries such as Mauritius.

So, it is clear that there do exist, primarily in the business world, quite complex inter-relationships between enterprises, and in these relationships it is quite common for there to be clumsy and difficult communications between the enterprises involved and customers or clients of those enterprises. What is needed is a federation customer service architecture that does not require explicit, point-to-point links to be configured in advance, and that allows a robust transitivity model to emerge. Further, when the new federated architecture is implemented, federations will become much larger and more complicated, and new and novel control over communications will be needed.

SUMMARY OF THE INVENTION

The inventors, having considerable experience in federation of enterprises for various projects and purposes, have devised new and novel ways that enterprises may federate and share work load, resources, and data. In the development of such new federation procedures and architecture, the inventors have also noted data sharing difficulties and potential problems and have devised new systems and procedures for solving the difficulties and problems.

Accordingly, in a first enterprise joined in a distributed, federated network of second enterprises, a system for managing data flow between enterprises is provided, comprising a data management server in the first enterprise having access to sets of rules for managing data flow to and from the first enterprise, a first data interface in the first enterprise dedicated to data transfer to a paired second dedicated data interface at a neighboring second enterprise in the federation. The first data interface manages data sent to the second interface and/or data incoming from the second interface according to the sets of rules for managing data flow.

In another aspect, in a first enterprise joined in a distributed, federated network of second enterprises, a method for managing data flow between enterprises is provided, comprising steps of (a) storing sets of data management rules in a data management server coupled to data transfer interfaces coupled to data management interfaces in neighboring enterprises; and (b) monitoring data received or for transfer by the interfaces according to the sets of rules.

BRIEF DESCRIPTION OF THE DRAWING FIGURES

DETAILED DESCRIPTION

Most federated arrangements, at the time of this filing, are still being conducted in a point-to-point, explicitly configured way today, just as described in the background section above for known federation architecture. Partly this is due to management preferences and immaturity of the market, but there are also technical challenges. The inventors believe it should be possible ideally to allow very flexible and dynamic federated communities of enterprises to serve rapidly changing market needs, and this is an object of the present invention.

Figure 1:
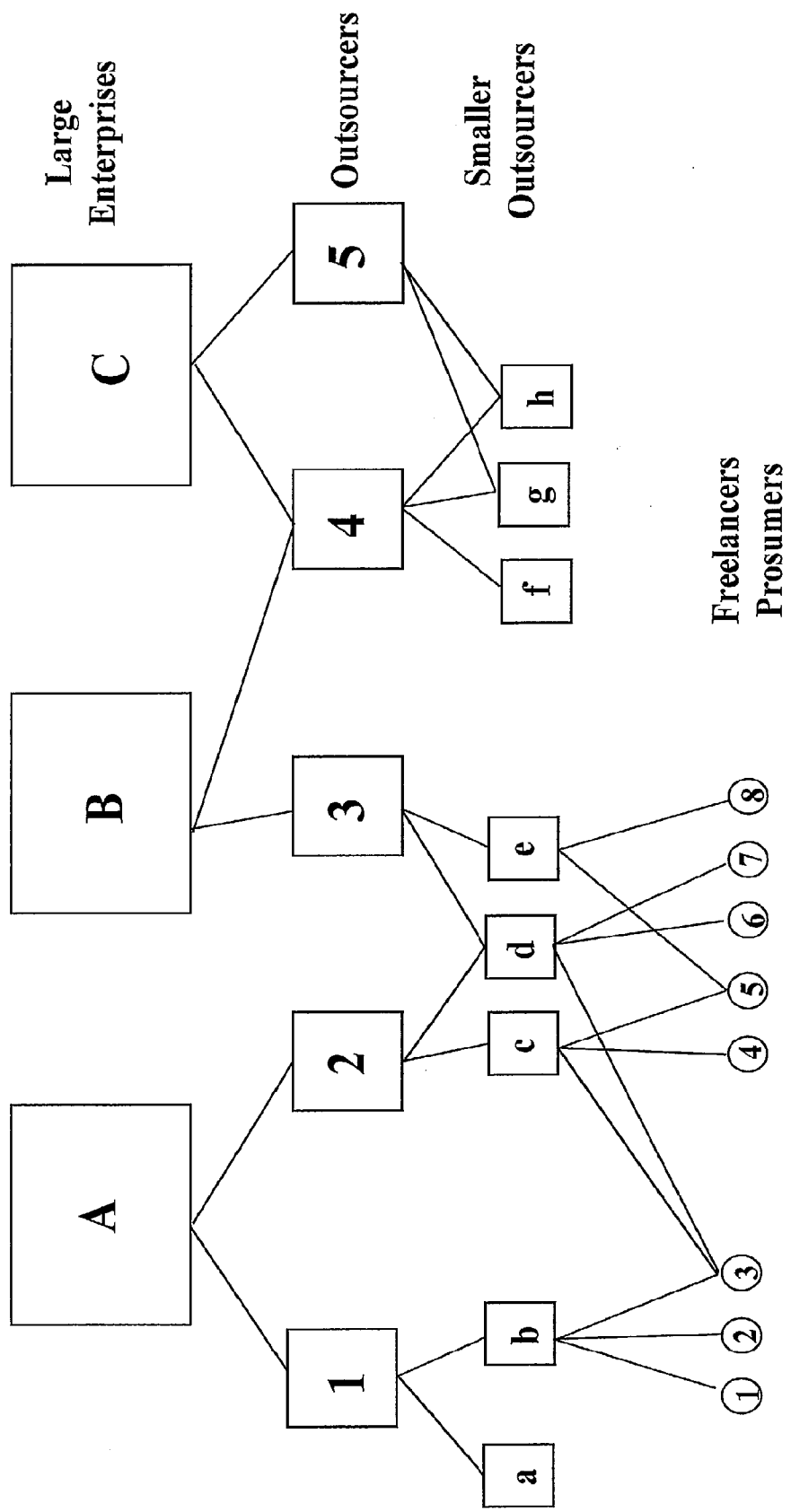
FIG. 1 is a diagram of a federation architecture in an embodiment of the present invention.

FIG. 1 is a diagram of a federation architecture in an embodiment of the present invention, wherein large enterprises A, B and C may each use large outsourcers 1, 2, 3, 4 and 5, who may in turn use smaller outsourcers a . . . h, some of which use freelancers or prosumers 1 . . . 8. Prosumers are consumers who are also producers, acting as workers or customers depending on the context. It is true in federated projects that contacts (or by extension, work, communications or information of any kind) might also flow sideways between large enterprises, such as shown in our mobile phone example, and also perhaps sideways at any level in the hierarchy.

The number of situations where a new sort of federation would be useful is very large. Consider the insurance industry, for example, which is characterized by many independent agents, some of whom represent more than one insurer depending on the type of insurance needed, many specialty insurers who sell and service their policies through larger horizontal insurers often invisibly to the insured, and complex state-dependent licensing requirements. It is definitely desirable to provide an arrangement for cooperation which would allow insurers to flexibly construct federated architectures that allow the insurers to take advantage of availability of many different kinds of market participants. For example, home-officed agents could take overflow contact center calls when not scheduled for appointments. Third party insurers could step up to handle common tasks for policies they don't normally service during times of crisis. Outsourcers could compete for traffic in a dynamic way based on real-time traffic dynamics, giving the insurer to surge capacity as required without every carrying excess capacity itself.

Providing such an architecture and federation quickly stretches the capabilities of existing federated architectures beyond the breaking point. Outsourcers and freelancers cannot typically service customers without access to at least some customer data, yet this data is extremely sensitive and subject to widely varying legal requirements for data protection and privacy. From an outsourcer's perspective, they may want to utilize the same CSRs to serve customers of different clients throughout the day as conditions evolve and, in situations where the clients allow outsourcers to compete for business, they want to keep operational visibility into their contact center to a minimum in order to preserve their ability to negotiate price effectively. And, as enterprises become more interdependent, and as online modes of communication and business process execution become more prominent, an ability to react quickly to sudden changes in demand, or in the supply of resources capable of meeting that demand, the importance of allowing operational managers to quickly reconfigure their service architectures is crucial.

A federated customer service architecture in an embodiment of the present invention requires an ability to control access to data and communications infrastructure (and to work, including customer contacts) intelligently, flexibly and with assurance that unauthorized access will be prohibited. In principle, it is desirable that unknown third parties may join the federation if they are able to meet entrance requirements, which may be formalized. The degree and sorts of data third parties can provide to satisfy the need for ensuring security and quality determines the degree of access to be allowed. Additionally, it is important that the transitivity of relationships be an integral part of the federation access infrastructure, so that members of the federation know what they can and cannot pass on to others.

Figure 2:
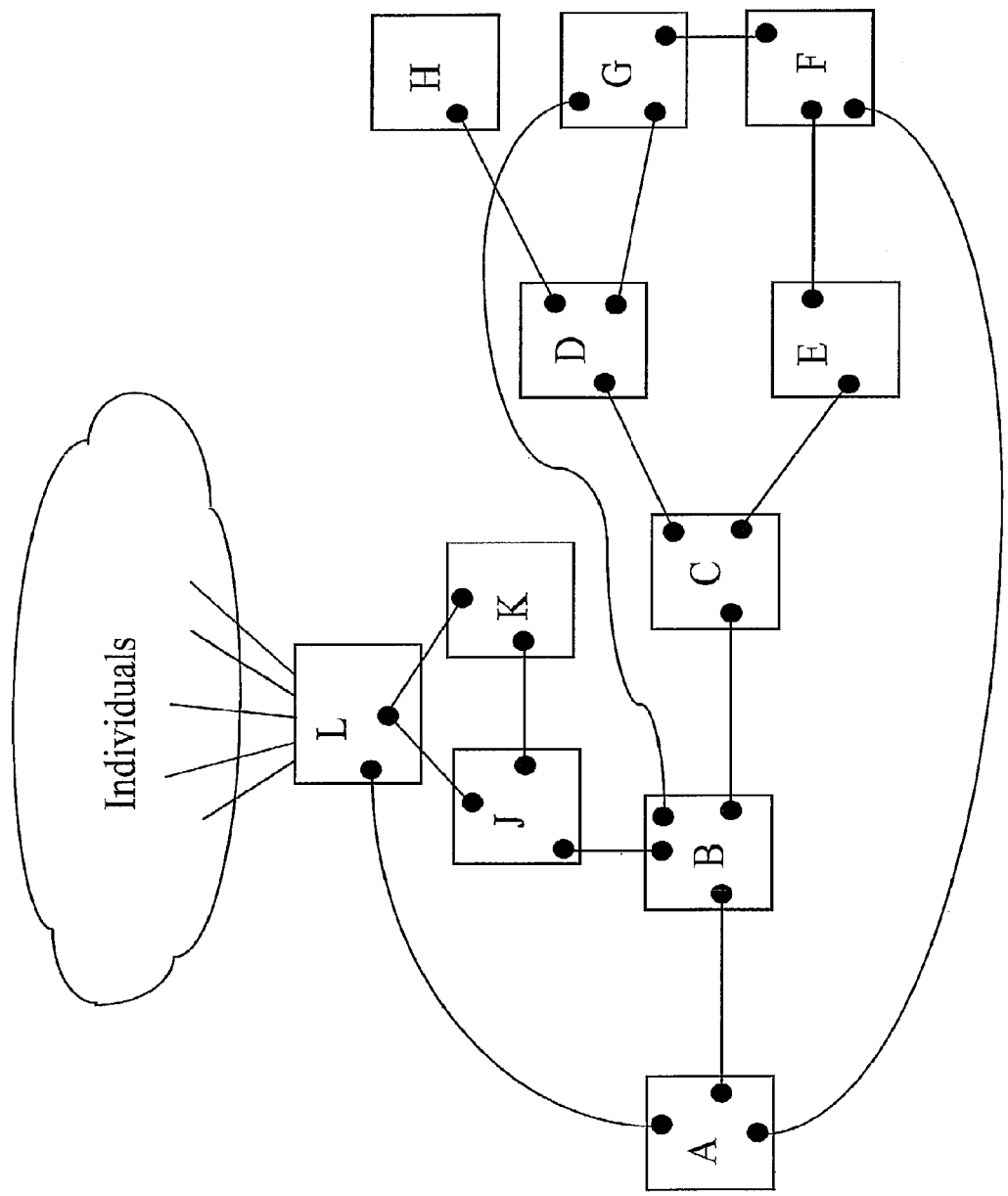
FIG. 2 illustrates another example of a relatively complicated architecture in an embodiment of the invention.
Figure 3:
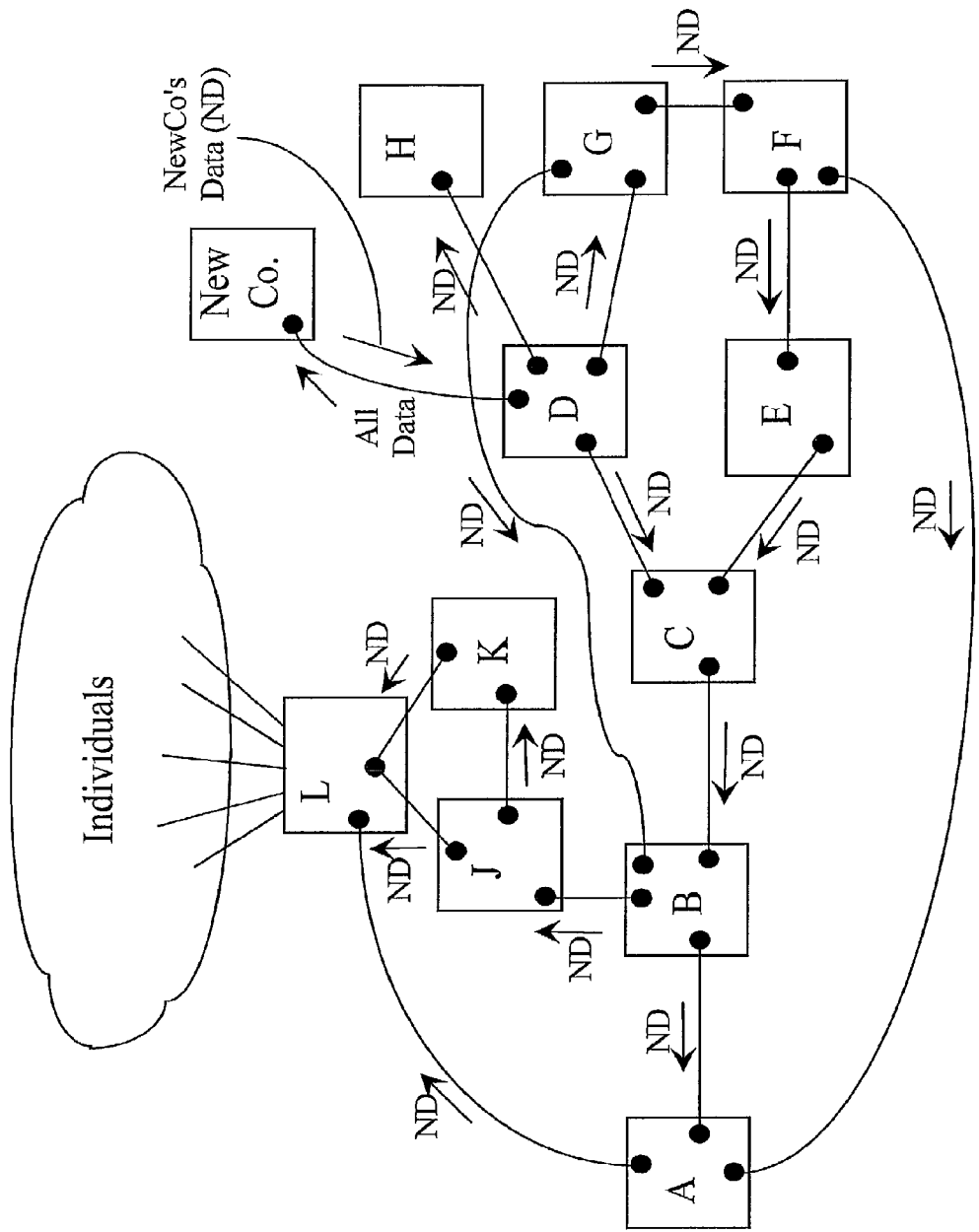
FIG. 3 is a diagram similar to FIG. 2, showing data flows following addition of an enterprise in an embodiment of the invention.

FIG. 2 and FIG. 3 are two different diagrams illustrating how federation works in various embodiments of the present invention. Referring firstly to FIG. 2, federation elements are shown for an Enterprise A (201), identified as H&R Block, a well-known provider of tax services. In enterprise A configuration server 203 handles configuration and registration issues, and stores data relative to rules, entities of the enterprise, relationships between members, contact names, transfer authorizations, et al. in database 204. A federation registrar function 202 is an interface for new candidates, such as potential new member 209, identified as to become a part of a federation including enterprise A. Two interfaces 205 and 206 labeled Federation Proxy are shown in the H&R Block enterprise, and these communicate with other enterprises that are already a part of the tax service federation, 205 with a Federation Proxy 207 for an Enterprise B, and 206 with a Federation Proxy 208 for an Outsource 1.

New Tax Team is a small team of tax specialists who have decided to set up shop and try to participate in tax service federations, one of which is led by H&R Block. Accordingly, they contact the federation registrar for H&R Block s shown in FIG. 2. An application for registration might be done in a number of different ways, but in one embodiment Federation Registrar 202 is a web service available via a published API at a known location. In this case New Tax Team has downloaded and installed a Federation Proxy Application, and the registration is attempted through New Tax Team's Federation Proxy software application.

Federation proxies in embodiments of the invention are software applications that facilitate exchange of data and communications between participants in a federated architecture. The proxies allow changes in configuration or state to be propagated as required across enterprise boundaries. In order to originally allow access, however, especially in scenarios where potentially unknown players will be allowed some degree of access, a publicly known access point is required. This is the Federated Registrar 202 in this example, and could be a website, an API, or even a phone number with a human being or automated voice application handling incoming requests.

In the example of FIG. 2 New Tax Team might download and install a proxy to deal with Federation Registrar 202. Then the proxy (or other application) for New Tax Team contacts Federation Registrar 202 and requests to participate in the federation. The request will follow a specific format requiring certain information and data, such as tax professional certification numbers, addresses, names, phone numbers of the licensed professionals in New Tax Team, and perhaps a link to a State Licensing website (Certification Authority 210) for validation. Federation Registrar 202 needs to ensure that the Federation Proxy of New Tax Team is indeed representing the named individuals. This can be done through a third party, which could allow for authenticated registrations by professionals followed by provision of a unique key that could be passed using secure HTTP or other secure means to the Federation Registrar; the Federation Registrar could then validate this with the third party.

The Federation Registrar could require certain unique identifying information regarding each of the professionals, which could then be checked with the State Licensing system. There are a number of ways known in the art to accomplish this sort of authentication. Once it has authenticated the potential new member of the federation, the Federation Registrar checks via the configuration server (which could be an LDAP server, an Active Directory server, a Genesys Configuration Server, or the like) and retrieves relevant rules regarding unsolicited membership requests. These could be anything from "don't accept any" to "only accept groups less than 10, with 100% state licensing verification", and current rules might also provide guidance on what to share after membership is granted. For instance, for new members who have not built up a reputation within the federation, the work and data allowed to be passed to the new members might only be validation of already-prepared tax forms with taxpayer-identifying information deleted. Alternatively, new members might be allowed to take tax hot line overflow calls until they prove themselves, that is, become more trusted over time. The rules could also allow use of third party certification providers to certify higher levels of competency; for instance, if an allowed certification authority certified that New Tax Team had 7 professionals with advanced tax counseling and return preparation qualifications, the rules might allow them to handle full client service immediately.

Once the Federation Registrar has accepted New Tax Team (if that is the result of the application), and has determined the rules to use with New Tax Team, New Tax Team configuration and its constraints are entered in the configuration database. The Federation Proxy or other registering application at the New Tax Team is notified by the Federation Registrar that they were accepted and connection parameters are passed so New Tax Team can connect to a Federation Proxy Server, such as server 205 or 206 within H&R Block.

There are two approaches to initializing configuration for the new member. In one approach, the Federation Registrar provides an initial configuration data dump to the new member, passing to New Tax Team whatever is appropriate based on its access levels as determined by the rules in the configuration database. In another approach, the Federation Registrar would do nothing but validate New Tax Team, determine the rules to apply, update the configuration database concerning New Tax Team, and possibly instantiate a new Federation Proxy Server.

Whether a new or existing Proxy Server instance is used, one message the Federation Registrar sends back to New Tax Team is "you're approved and should contact our Federation Proxy at this address". When New Tax Team's Federation Proxy Server establishes first contact with the specified Federation Proxy Server at H&R Block, it will request and receive a configuration data dump. This data will tell it what rules it must abide by. These rules could be anything from the hours when the new member is eligible to participate, to the maximum income for which it is allowed to process tax returns, to the maximum time it is allowed to work on specific tasks. A special class of rules that can be provided, and in both directions, is the class of data and communication propagation rules, such as transitivity rules mentioned earlier. New Tax Team may state that information concerning its tax professionals may not be shared outside of the originally contacted enterprise, in this case, H&R Block. New Tax Team may on the other hand state that this information can be freely propagated to other federation members, which means the New Tax Team might get work from Outsource 1 in times when the H&R Block load allowed excess capacity. And similarly the transitivity rules could apply in the other direction. For instance H&R Block could stipulate that no customer data or work can be sent outside of New Tax Team under any circumstances.

New Tax Team has joined the federation of H&R Block as described above, but does not desire to be only a part of that single federation, so they register as well with Intuit in a separate operation, through the Federation Registrar at Intuit. The process is the same as described above for registering with H&R Block.

Assuming now that New Tax Team is accepted by Intuit, and added as a member of the federation at Intuit, FIG. 3 represents an architecture that might result. New Tax Team has been accepted by both H&R Block (201) and Intuit (301), and each have informed New Tax Team 209 to set up a Federated Proxy (Fed Prox) coupled to a specified Fed Prox at each of Intuit and H&R Block, as is shown in FIG. 3. H&R Block also has existing federation with Outsourcer 1 (302) and Outsourcer 2 (303), and coupled Fed Prox interfaces for each. Intuit has existing Federated relationship with Outsourcer 2 and Outsourcer 3 (304) as shown. So Outsourcer 2 is a member of both the H&R Block and the Intuit federation, just as is New Tax Team. Note that each of the H&R Block and Intuit each have a Federated Registrar through which other enterprises may join the federation each manages, but the other enterprises in the federated systems do not.

At the point of acceptance in a federation the new member is ready to work within the federation. However, no one outside of the original enterprises yet knows about the new resources. Depending on the rules, and the business need, it could be very important for outsourcers 1 and 2 to know about tax counselors working for H&R Block (for instance, if the outsourcers handle inquiries and need to be able to conference in and share data with the original preparer when customers call in with questions). To accomplish this, the configuration server evaluates each change in configuration and applies access rules to determine which federation members require notification of the change(s). In the case of the addition of New Tax Team, H&R Block and Intuit might each send information along to their outsourcer partners. This illustrates a novel and unique concept of Federated Access in embodiments of the invention: changes can propagate through enterprises.

In some cases, changes may take place outside the enterprise; for example, another partner (not shown) of H&R Block may add some additional service capabilities. These changes would be sent to H&R Block via a Federation Proxy Server (FPS). The FPS at H&R Block would update the local configuration server, which would then notify applicable FPS' within H&R Block (based on stored rules, as before) of the changes. Each FPS would notify its counterpart in other enterprises of the changes it was specifically notified of (not all changes will propagate everywhere, only where needed).

One situation that can occur in this federated architecture is collision of identical notifications that arrive at a particular enterprise by different paths. For instance, the addition of New Tax Team will potentially arrive at Outsourcer 2 from H&R Block and from Intuit. And indeed, the data could be different based on different rules applied in the different tax firms. For instance, "authorized work types" could arrive from each of the two firms regarding New Tax Team, one set representing the result of H&R Block's rules and the other representing the result of Intuit's rules. Outsourcer 2's business rules would determine how these different data sets would be handled. In most cases, both sets of authorized work types would be retained, with one being applied for H&R Block work and one for Intuit work.

It may happen that OS 2 desires to enter into a direct relationship with New Tax Team, rather than allowing H&R Block or Intuit to act as intermediary. This can be done if the data about New Tax Team is allowed to propagate through the federation. In this case, OS 2 may initiate a direct pairing of Federation Proxy Servers between New Tax Team and OS 2; note that not every member of a federation needs to have a Federation Registrar, but only those members who plan to allow unsolicited membership requests.

There are two modes of propagating state changes, configuration changes and work/data through federations. In one mode, data is pushed to all eligible members as soon as it is generated or received. In other cases, data is pulled by members as needed. In the case of work items, for example, members such as New Tax Team could send requests for additional work (perhaps specifying work type, complexity level, and acceptable price) to H&R Block and/or Intuit via the paired and coupled FPs. These requests could be denied, or met, or partially met. In some cases, members who have work that they wish to source out to the federation could allow the various eligible members to bid for the work, effectively providing a means for establishing auction-based service markets. Alternatively, the auction could work the other way around; New Tax Team could allow Intuit and H&R Block to compete for its talented tax advisors. There are as many ways for this to occur as there are ways for normal commerce to be conducted—reverse auctions, fixed prices, regular auctions, variable price, etc.

FIG. 3 showing New Tax Team in one sense shows two federations; one managed by H&R Block and one by Intuit. In fact, there could be any number of linked federations, and there is in principle no need of a centralized "federation hoster" entity. There are roles to be played by third party certifiers (They provide means for validating potential new partners by trusting neutral third party, which could be a government agency, especially when licensing requirements exist), as well as by intermediaries who act as public registrars for many federations and then propagate new members or member status changes into the applicable federations based on rules provided by those federations and enforced by the trusted registrar.

The Federation Access system in embodiments of the present invention, as described above, allows pulling of data as well as work. Thus, when an entity finds itself in need of certain work to handle unexpected volume or type of work, it can query its neighbors in the federation (those with which it has proxy-proxy connections) to seek what it needs. Such a query could specify qualifications (and certification requirements) needed for the proposed work, the acceptable price or range of prices, the time period during which the work is needed, and so forth. This query can be propagated through one or more federations, if the rules in force at intermediary locations permit it, until suitable sources are identified. Based on the degree of restriction of the transitivity rules in effect, what gets propagated far from the original source is the statement of need and contact information for a Federation Registrar or a Federation Proxy Server that is "closer to" or "part of" the requesting entity. That is, an immediate neighbor of the requesting entity may offer a Federation Registrar service, and the requesting entity may have a close relationship with relatively open data propagation rules. So, when a distant third party who is able to provide the requested service but does not have the requisite details to confirm the "deal" and do the work, it will be able to establish a new Proxy-to-Proxy connection with a neighbor, assert its readiness and ability to properly meet the need, and ask for the offer to be communicated. In this way, federations can reconfigure and work can flow as market conditions require, without requiring a single centralized federation manager or an "all-or-nothing" set of business rules about data or work propagation.

The examples above describe a situation in which a small enterprise of persons skilled in tax matters may seek to partner with larger enterprises engaged in tax services and thus find remunerative employment for their skills. In a like manner the larger enterprises are also enabled by embodiments of the same invention to find other enterprises, such as the New Tax Team described who may offer tax-related services at a lower cost, for example, than the larger enterprise may accomplish on their own, and thus offer an enhanced profit path for the larger enterprise.

The focused purpose of the enterprises, in this case tax matters, is of no consequence to the invention. Embodiments of the invention provide similar advantages in such technical areas as contact centers used by many enterprises for maintaining contact with, offering services to, and providing product and service offers (sales) to their customers and clients. In this area a small enterprise seeking registration with a larger enterprise may be required to provide evidence of technical infrastructure, such as agent stations, telephone and other messaging services, as well as competence and training of potential agents that would be fielding calls from customers of the larger enterprise. In many cases in the area of service and sales contact centers most services are already provided by outsourcers allied with the larger enterprise, and the yet smaller outsourcers would be contracting with the larger outsourcers for employment.

Emphasis was placed in the description above of the architecture in enterprise premises, both hardware and software, to enable embodiments of the invention, and in the functions of registration and details of connection and cooperation after registration, one important feature being ability to pass authorization for presence detection, agent identification, contact information and the like through one enterprise to another. This deserves a bit more emphasis here. In conventional federation an enterprise makes an alliance with another, say a first outsourcer, and as a result, agents of the enterprise and the first outsourcer may operate at times as though they are agents of the other, with small, if any distinction. In the case of contact center services, for example, a customer may call in, and be routed to an agent of either the enterprise or the outsourcer with no way of telling there is a difference. Agents of the two may likewise see the presence of other agents of both enterprises as though they were all from one enterprise, and seamlessly transfer calls and messages. However, if the enterprise has a separate relationship with a second outsourcer, the first alliance and the second alliance operate as completely distinct service entities, with no economy of scale or sharing of resources, for example.

In embodiments of the present invention the enterprise just described may federate with the first outsourcer, and then the second outsourcer, and then operate with both (all three) as a single service entity, assuming agreement by both the first and the second outsourcer. The first outsourcer in this situation, by granting access (perhaps in a limited fashion) to information, data, and presence to the enterprise, also grants the same permissions and authority to the second outsourcer, making it possible for the enterprise to consolidate services.

Referring again to FIG. 1, it is seen that Enterprise B, for example, federates with both outsourcers 3 and 4, and Enterprise C also federates with outsourcer 4; and outsourcer 4 is seen to federate with g and h, also federated with outsourcer 5. In embodiments of the present invention such overlapped and integrated federations are not only possible, but encouraged, and new business opportunities and economies result.

A procedure was described above with reference to FIG. 2 by which a small enterprise, such as New Tax Team, might federate with a larger enterprise like H&R Block to gain an influx of remunerative employment. In that federation, limits, pricing, and the like have to be negotiated, agreed to, and then saved as configuration data, which then affects the interfaces between the two enterprises, the interfaces acting in some respects as filters. There are vastly more features in other embodiments of the invention. For example, the registrar aspects make it possible for small enterprises (outsourcers) to compete for business from the larger entity. H&R Block in this example might be motivated to outsource all of their tax work through a bidding process wherein the outsourcers are encouraged to upgrade and economize their services and then bid on a regular basis for all work against similar bids by other outsourcers, and a relatively elaborate system might result including goals, performance against goals, scoring system, and the like to have a relatively constant effect of ensuring that H&R Block gets good work at the absolutely least cost on an ongoing basis.

In another aspect H&R Block might aggregate work, calculate cost for a profit goal, and post the work and the price that will obtain the work, and the outsourcers may then, on a first come basis, claim the work. Of course in all such cases performance counts. These and many like arrangements may be made by virtue of the configuration server and software, and the procedures for federation described.

Another aspect of the invention is training. An enterprise like H&R Block might expand through federation and training, offering training courses in tax matters, such that a group of not-so-experienced persons might federate with H&R Block at a trainee level, being offered training and gradually more complicated work to build into a useful federation partner. Many opportunities exist in this area.

It should be clear by the above description that there must be at least software compatibility, and in some cases some hardware compatibility as well between enterprises for the federation to be possible in embodiments of the invention. In one aspect the software might be proprietary to an enterprise such as H&R Block, and H&R Block might offer the software to enterprises that might wish to federate. In this case the federation all centers on H&R Block as the controlling enterprise, although the federation could still be far-reaching and complicated, with transitivity occurring at several levels. Still, however, the federation will have strict boundaries.

In another aspect the software may be a third-party matter licensed rather freely, or sold and licensed, such that newly formed enterprises need not have to install and operate to different federation systems to serve in federation with two or more large entities. There are advantages, that is, if H&R Block and Intuit, for example, use the same and compatible software and systems for federation, then more robust federations like FIG. 3 are possible.

In another aspect a federation broker might be instantiated as a central service where candidate federation members could register. The service could act either as a directory that can be queried by all federation members for other members (potentially with passing filters such as service type, currently available capacity, SLA offering, supported contract models, etc.); or it could be set up as an active broker making decisions about the best fit between service requesting and service offering federation members. In this aspect individual enterprises in a federation might not have a federation registrar, with the broker matching and enabling members of federations.

Another aspect of federation membership is the Service Level Agreement (SLA) related processing mode: A federation member could act either as an autonomous entity regarding SLA commitments (i.e. its SLA commitment applies only to the interaction processing from entering until leaving the given member); or it could be collaborative where the processing by other federation members is taken into account in order to achieve an overall SLA goal.

Further to the above a federation member might join a federation with specific intake control policies. Those policies could be for example: (a) any number of interactions can be sent for processing at any given time (unrestricted capacity) (b) intake queue with limited concurrent capacity (comparable to number of phone lines available for a traditional call center where excess calls will get busy signal) (c) the federation member pulls interactions from an external queue (could be implemented via "traffic light" indicating when the member is ready to receive another interaction).

In yet another aspect a federation member might be rated regarding service quality based on actual processing results. Such rating could be both federation internal (based on mutual experiences of federation members which could be quantified through reporting) or external where end consumers would provide their feedback (e.g. via a survey, for example).

In still another aspect there may be a several federation registrar/broker entities exchanging information about their locally registered members. This architecture could be similar to Domain Name Services (DNS) and/or supernodes in peer-to-peer networks.

Sophisticated federated architectures that will occur following implementation of embodiments of this invention will be larger and more complex than federations known in the past, and there will be additional problems attendant to the sheer scale that will emerge. When enterprises can federate with one another, and their federation partners can in turn federated with others, without a central controlling authority, it is entirely possible, and in fact likely, that what will emerge is an architecture that is distinctly web-like rather than the hierarchical strictly separate groupings that typify more conservative federated architectures at the time of the present patent application.

FIG. 2 illustrates a rather simple example of a complex federated architecture that might result from practicing embodiments of the present invention. Each enterprise is federated with one or more others through federation proxies shown as solid circles, with each enterprise federated with another shown joined by a line of communication between dedicated proxies, as taught above. Enterprise A is federated with L, B and F; B with A, C and J; C with B, D and E; D with C, G and H; E with C and F; F with E, A and G; G with D, B and F; H with D; J with B, K and L; and K with J and L. Enterprise L acts as an aggregator for large numbers of individuals, such as freelance insurance agents or customer service representatives. When one considers the situation of large scale service markets in which many outsourcers of different sizes serve many clients, and when many smaller players or even individuals participate through a variety of means (such as the use of an aggregator such as enterprise L), these federated architectures can become arbitrarily large and complex.

In addition to the challenges of regulating access to, and sharing of data, work and communications in such a complex set of federations, for really there is no one distinct federation in FIG. 2, but many local federations joined in a large, decentralized federated architecture typical of emerging service markets, it is necessary to take into account the quantity of data that may get propagated in such architectures.

FIG. 3 illustrates the diverse federated architecture of FIG. 2 under a situation that a new member, NewCo, has joined the aggregated federation, through negotiation with Enterprise D. Now configuration and state data must be exchanged before NewCo can properly participate. In a simplistic approach, enterprise D sends everything that it has that NewCo has access privileges to see (labeled All Data in FIG. 3), and NewCo sends everything it has that it wants to share to enterprise D, labeled NewCo's data abbreviated ND.

A sudden appearance of a new member, and letting loose the considerable data the addition will cause, can cause at least two significant problems. Firstly, if the access rules are in general permissive, there could be an enormous amount of data, concerning an arbitrarily large number of federation members, that is dumped to NewCo all at once, potentially causing significant network congestion between Enterprise D and NewCo. Secondly, the data about NewCo could also be significant, since none of it would initially be known to any federation members. So when Enterprise D gets the data from NewCo, there is potential for congestion if it is all delivered at once. Worse yet, Enterprise D would then, in the simplistic case, send configuration updates immediately to Enterprises C, G and H, who in turn would send the data (assume for the moment that all data is meant to be forwarded) to connected federation partners, each data "dump" abbreviated ND, for NewCo Data. In fact, as the data is propagated outward from NewCo, it would go first to C, G, H, then on to the enterprises connected to C, G and H. Note that B would get updated from C and G, and similarly in following time steps E other enterprises would get updated by more than one connected enterprise as well.

This prolific propagation of configuration and state data concerning a new entrant into the federation would be more and more problematic as the number of participants expands, and it is anticipated by the inventors that "federation webs" of dozens or more enterprises, with potentially thousands of smaller players, will arise in the near future in response to embodiments of this new invention. What is more, the data about NewCo received in this example by C might be different when it comes from E than when it comes from D, since D and E, and their predecessors in the propagation chain, might have different access rules configured on their own behalf. This will happen because not only does NewCo have the right and need to dictate rules about how its data can be propagated, but each intermediate enterprise has the ability to censor what it sends on. Enterprise C, for example, might choose not to reveal the existence of new partners to its existing partners, for any number of business reasons. So situations can arise where a single update from one enterprise leads to multiple different updates being delivered to individual enterprises in the federation web. Finally, problems such as that illustrated in this example can also occur whenever state changes or configuration changes occur within any enterprise, for example, if agents are moved from one group to another. Thus there is a real risk of cascades of data circulating around such federation webs and adversely impacting network infrastructure.

A similar problem can occur when new capacity is added to the federation either through addition of a new member or the addition of new capacity within a member. If work, or customer contacts, are being routed within the federation and there is a substantial number of work items or customer contacts queued up for handling, and a new "chunk" of capacity is added, the new capacity could easily be flooded by work items or contacts sent from several different federation members simultaneously. This is because each of them may have a task router that "sees" the new capacity and assigns queued items that it is managing to the new capacity. But since there may be several such routers, each independently seeing the change in available capacity, the newly added capacity is likely to be overwhelmed immediately by new contacts or tasks to handle.

Clearly there is a crucial need for a federation customer service architecture that employs rather sophisticated uptake throttling, where uptake refers to the uptake of configuration and state information and work items or contacts into the federation from individual enterprises, especially during times of sudden change in the structure or capacity of the federation web.

Figure 4:
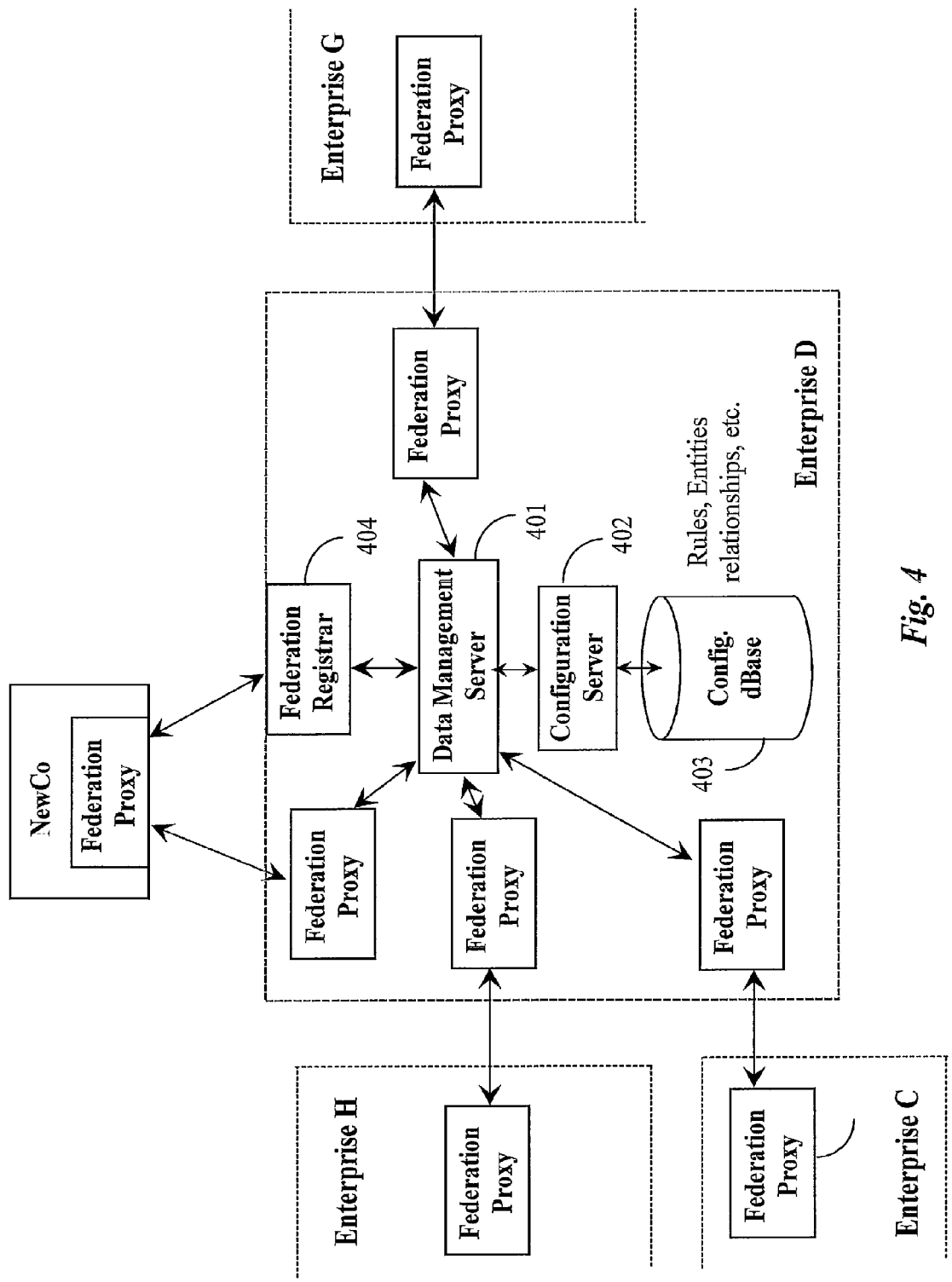
FIG. 4 is a more detailed view of an enterprise adding a new enterprise in a federation in an embodiment of the present invention.

FIG. 4 is a more detailed diagram showing enterprise D (401) of FIG. 3 engaged with NewCo, also showing connection of Enterprise D to Enterprises C, G, and H via paired federated proxies. There are several different modes in which data is transferred from one enterprise to another. In one mode, the source proxy server pushes data to the target proxy server when there is data to be transmitted. Only new or modified data needs to be pushed at any given time. Further, the data can be passed in order of likely relevance. For example, state changes that are essential for routing decisions, or actual contacts to be routed, might be passed first when there is a large amount of data, whereas contextual data such as customer data that can assist during an interaction could be passed later since it would not be needed immediately. The data can be throttled by the sending proxy server at a single constant bandwidth (for instance, up to 50 kilobytes of data per second could be sent), or the sending server can allocate a fixed amount of bandwidth for voice traffic, another fixed amount for text messages, and then a varying amount for passing state and configuration data; this method would ensure adequate bandwidth for data types that require low latency. Alternatively the sending and receiving proxy servers can coordinate the pushing of data. For instance, the sending proxy server can start by sending a datagram notifying the intended recipient that it has data, or contacts, to send, and it could provide a breakdown on the number and size of data and communications elements to be passed; these could be further segmented by criticality of the elements to be passed and the need for low latency for each type of element. Then the receiving proxy server can notify the sending server when it is ready to receive, and how much it is ready to receive; in this case the throttling is under the control of the recipient.

An alternative to pushing data is to allow recipients to pull data as needed. In this case, when a new member joins or a configuration update is made in an existing member, the target members can be notified that changes exist, but the actual passing of changed data would not occur until the intended recipient sends the source a message requesting the updated data. Alternatively no notifications of changes are needed, but when a member is about to make a decision it may request from other members to be sent updated data. For example, when an enterprise has a call to be routed and determines that it would prefer to send the call to a federation partner (an outsourcer or a member of the service chain required for the particular call), it can send a message to the potential recipients asking for their current load conditions and for a list of available resources to take the call. In this way, state changes and statistical updates are only transmitted when required. Also, this method can be modified by allowing a member who requires updated information on, for example, the existence of logged-in agents qualified to handle a certain call type, to query the source member for the time since this information has changed. This would also be useful for maintaining current configuration databases across multiple enterprises. When an enterprise requests another to inform it of the time when a certain set of configuration data was last updated and it learns that it already has data that is newer than the last update, it need not have the data transmitted again. Extending this concept, when data is structured hierarchically as it commonly is, the querying member could ask for the last update time for the root node of a tree. If the date is older than the last update received for the tree, no further action would be required. If the date is newer, then the receiving member can "drill in" to the hierarchy and find which of the first-level nodes or branches are newer, and so on down the tree, only inspecting those branches which have new data. In this way the minimum amount of data is transmitted and the configuration data is kept updated at the same time.

Another aspect of uptake throttling is ensuring that the same data is not sent more than once to the same destination. As noted this can be challenging because the existence of data propagation rules within each enterprise means that there could be different subsets of the data (e.g., the configuration data for NewCo arriving at enterprise E from enterprises C and I in the earlier example). In this case, if the pull method is used, the receiving enterprise would need to receive a pushed message notifying it that a new member has been added and there is data available concerning the new member. Note that if the data propagation rules in C and F had eliminated all data such that none was allowed to be transferred to E, there would be no need for such a notification from either C or F, and indeed E would not know of the existence of the new member; this would be quite common in very large federation webs). Then, instead of comparing dates of changes, the receiving proxies would each ask for the name and size of the root node. If they were the same, then the receiving enterprise could in essence choose one of the two sources to deliver the data, and never request the data from the other. As in the data case, if the roots are different or the sizes are different, the receiving enterprise can traverse the tree for each source enterprise's data set, comparing names and sizes and essentially developing a map of all of the data available. It could be that one site has more data than the other, and includes all of the other site's data plus more, but it could also be that each has some data that the other doesn't and some data will be required from each. All of this comparison of dates and sizes, and traversals of hierarchical tree structures, could be driven by the configuration server in the target enterprise, or it could be driven by a separate data management server which would then pass the relevant data to the configuration server. A standard path query language such as XPath could be used to traverse the trees.

In the case of two paths to the same node, when push is being used, one of the two sending nodes will naturally start pushing the new data first. If the data has been fully transmitted by the time the second enterprise starts to send, then when the second one does start to send the receiving site could send an interrupt essentially saying "I have already gotten data concerning this NewCo; the root node is XYZ and the total size is 13,678,344 bytes. What have you got for me?" whereupon a similar comparison could take place to that described above for the pull mode.

Clearly other methods could be used to additionally help manage bandwidth conservation and to avoid overloading newly added capacity. For example reputation or quality statistics could be used to choose which of two sites to take data from, or latency measurements. If there are two sites each offering the same data, the data may more reliably be taken from the one who has shown better overall network consistency and throughput. Also, use of a "parsimony rule" within the federation in which only data that needs to be propagated gets propagated can be used. This means rules might be more restricted than purely privacy or competitive concerns would dictate. If I know that, for example, calls only flow one way between two enterprises, then there is little need to propagate agent state changes from the call source to the call sink, since the call sink will never send calls upstream and therefore does not need agent state data.

Figure 5:
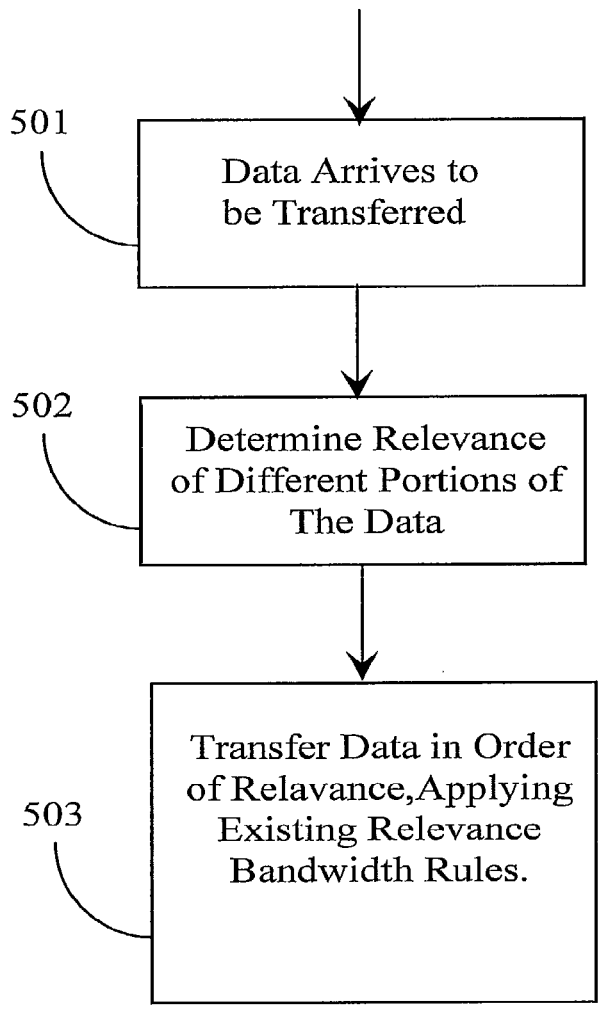
FIG. 5 is a flow diagram illustrating a method for sharing data between enterprises in an embodiment of the present invention.

FIG. 5 is a flow diagram illustrating a method for sharing data between enterprises in an embodiment of the present invention. At step 501 data arrives at a federation proxy to be transferred to a paired proxy at a neighboring enterprise. As step 502 the proxy at the sender determines relative relevance of different portions of the data, and at step 503 the data is transferred in order of relevance, applying existing relevance rules bandwidth rules.

Figure 6:
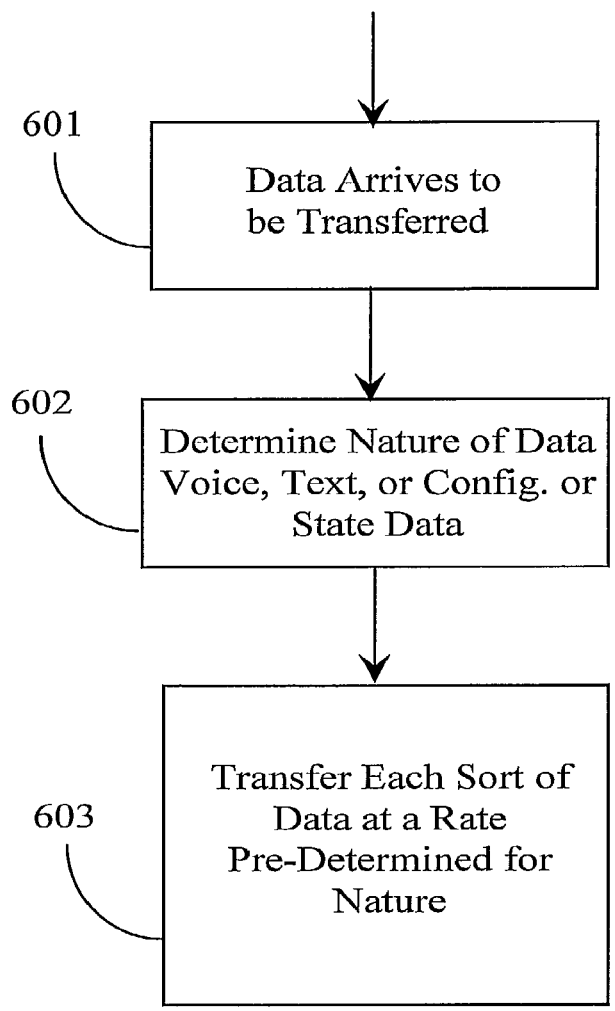
FIG. 6 is a flow diagram illustrating another method for sharing data between enterprises in an embodiment of the present invention.

FIG. 6 is a flow diagram illustrating another method for sharing data between enterprises in an embodiment of the present invention. At step 601 data arrives to be transferred. At step 602 the proxy at the sender determines nature of the data as voice, Text, or configuration/state data. At step 603 the sender transmits data at a rate pre-determined by nature of the data.

Figure 7:
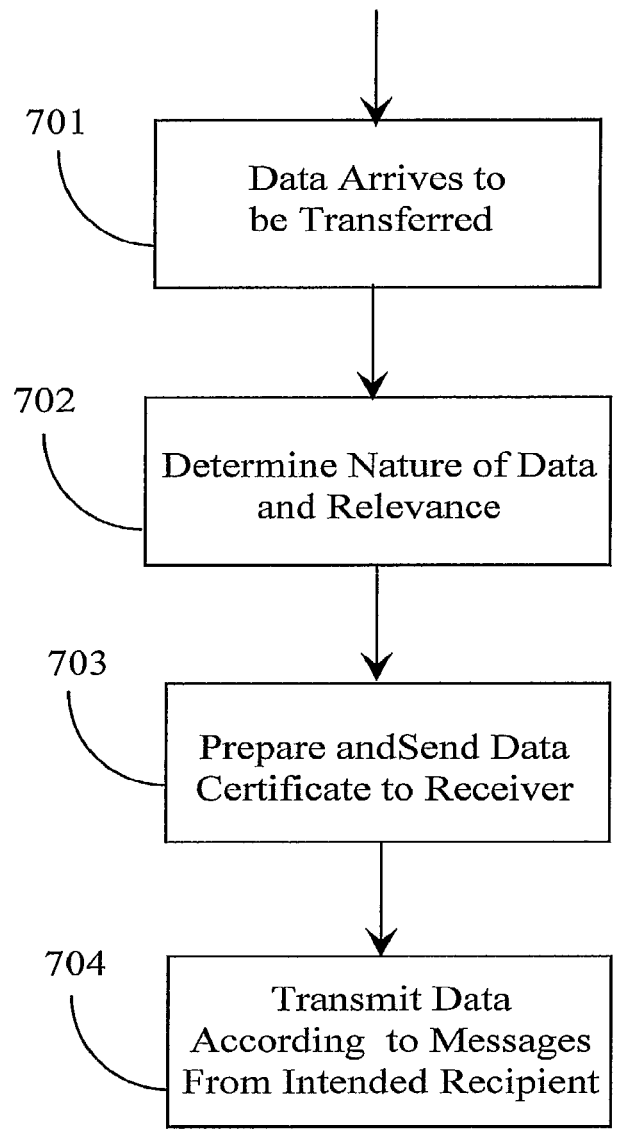
FIG. 7 is a flow diagram illustrating yet another method for sharing data between enterprises in an embodiment of the present invention.

FIG. 7 is a flow diagram illustrating yet another method for sharing data between enterprises in an embodiment of the present invention. At step 701 data arrives to be transferred. At step 702 the sender determines the nature of the data and relevance. At step 703 the sender prepares and sends a data certificate to the receiver, listing the nature and source of the data, and perhaps other data details. At step 704 the sender monitors for messages from the recipient, and transmits data according to messages asking for data.

Figure 8:
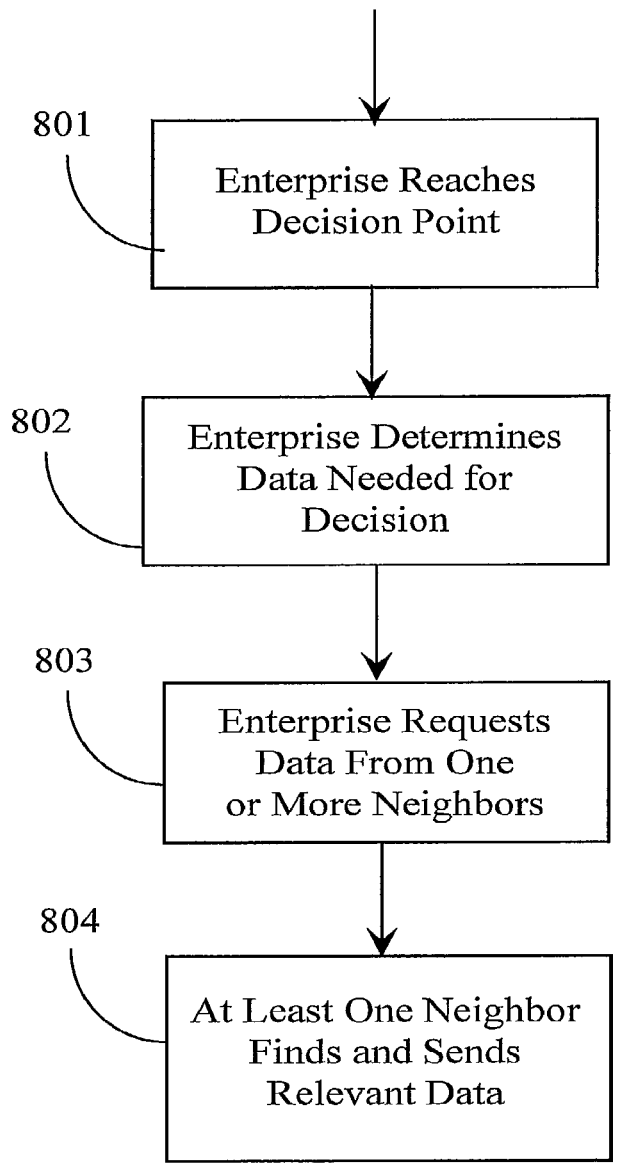
FIG. 8 is a flow diagram illustrating still another method for sharing data between enterprises in an embodiment of the present invention.

FIG. 8 is a flow diagram illustrating still another method for sharing data between enterprises in an embodiment of the present invention. At step 801 an enterprise reaches a decision point. At step 802 the enterprise determines that the decision requires data. At step 803 the enterprise requests the needed data from a neighbor enterprise in the federation. At step 804 at least one neighbor finds and sends relevant data.

Figure 9:
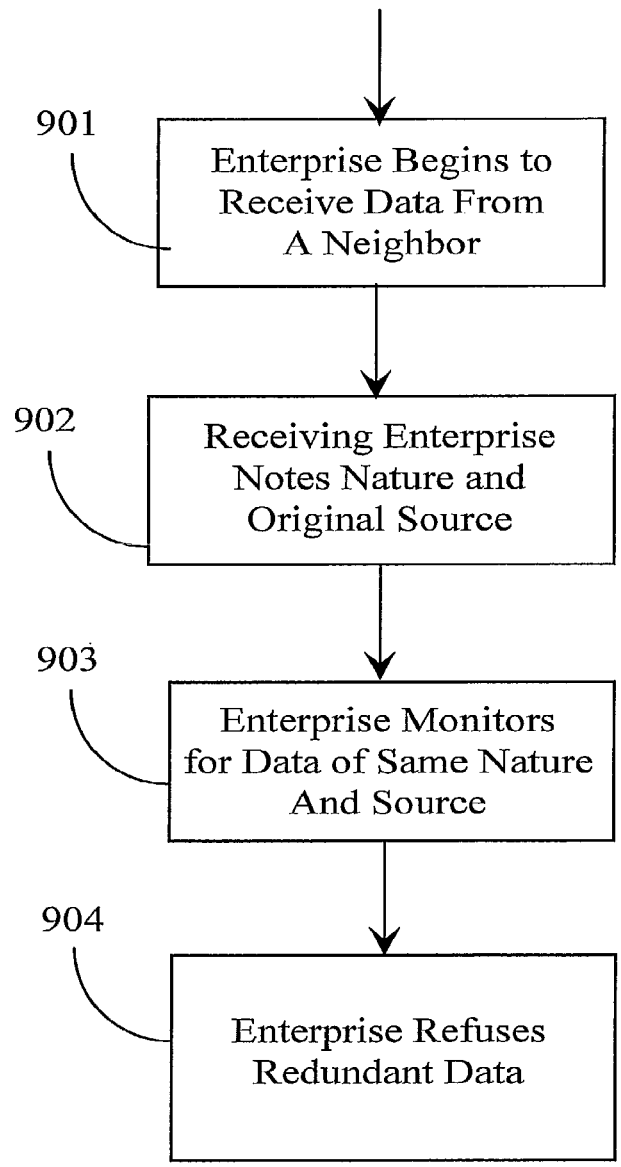
FIG. 9 is a flow diagram illustrating still another method for sharing data between enterprises in an embodiment of the present invention.

FIG. 9 is a flow diagram illustrating still another method for sharing data between enterprises in an embodiment of the present invention. At step 901 an enterprise begins to receive data from a neighbor. At step 902 the receiving enterprise notes the nature and original source of the data. At step 903 the enterprise monitors from data of the same nature and source. At step 904 the enterprise refuses redundant data.

Figure 10:
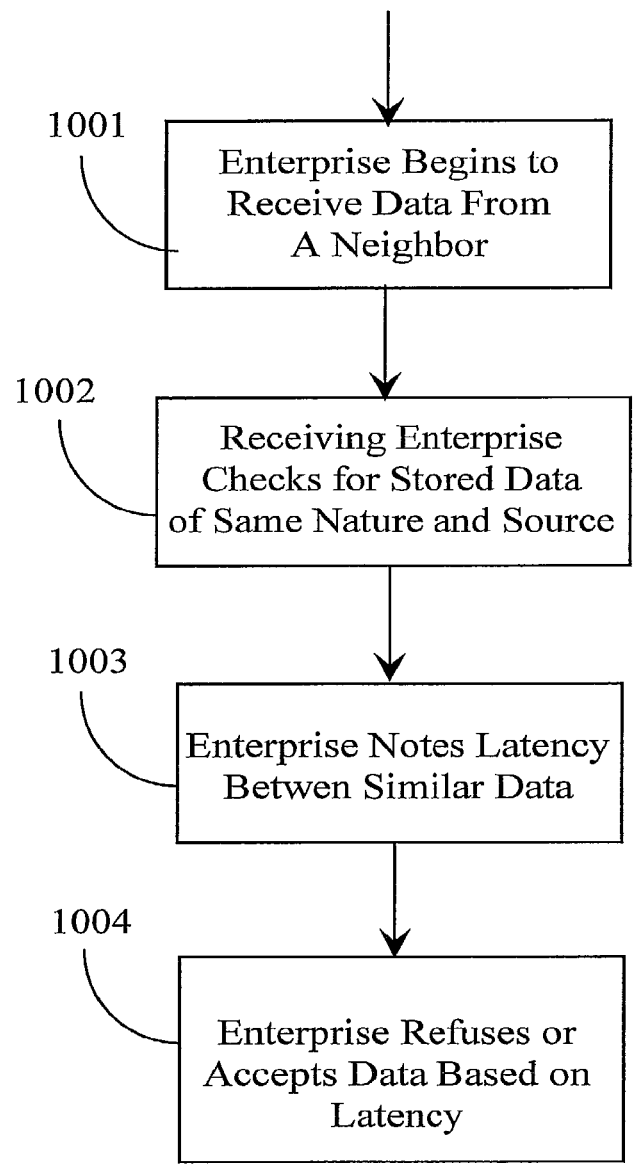
FIG. 10 is a flow diagram illustrating yet another method for sharing data between enterprises in an embodiment of the present invention.

FIG. 10 is a flow diagram illustrating yet another method for sharing data between enterprises in an embodiment of the present invention. At step 1001 an enterprise begins to receive data from a federation neighbor. At step 1002 the enterprise checks for stored data of the same nature and original source. At step 1003 the enterprise notes latency between similar data and the data being received. At step m1004 the enterprise accepts or refuses data based on latency.

It will be apparent to the skilled person that there are many alterations that might be made in the embodiments described above without departing from the spirit and scope of the invention. For example, a preferable means of communication between enterprises in the federated architectures described is the well-known Internet network, but that is not limiting. Other network connections might be useful. For example, the novel join and authorize federated system taught may be employed for work groups and departments wholly within an enterprise, and communication might be across a local area network, or a combination of LANs at several enterprise sites joined over the Internet. Similar federations might be workable in non-profit and government sectors as well, and in political parties and religious groups. The invention is limited only by the scope of the claims that follow.

What is claimed is:

1. A system for managing data flow between a plurality of enterprises in a federation comprising:
a processor hosted by a first enterprise in the federation;
a memory, wherein the memory has stored thereon instructions that, when executed by the processor, causes the processor to:
identify a change in structure or capacity of the federation triggered by an admittance of a requesting entity into the federation, wherein the change generates data to be provided to the plurality of enterprises in the federation;
identify the data to be transmitted to the plurality of enterprises in the federation in response to the change; and
throttle transmission of the data to the plurality of the enterprises in the federation based on rules for managing data flow between the plurality of enterprises, wherein the instructions that cause the processor to throttle transmission of the data includes instructions that cause the processor to transmit at least a portion of the data to a second enterprise of the plurality of enterprises in the federation, and refrain from transmitting the portion of the data to a third enterprise of the plurality of enterprises in the federation.

2. The system of claim 1, wherein the access rules include rules for assigning bandwidth for transmitting the identified data, wherein the program instructions further cause the processor to:
identify a type of data contained in the portion of the identified data;
identify a first bandwidth allocated to the type of data based on the rules; and
transmit the portion of the data to the second enterprise in accordance with the allocated first bandwidth.

3. The system of claim 2, wherein the program instructions further cause the processor to:
identify a second bandwidth allocated to a second portion of the identified data based on the rules, wherein the second bandwidth is different from the first bandwidth; and
transmit the second portion of the identified data in accordance with the allocated second bandwidth.

4. The system of claim 3, wherein the portion of the identified data associated with the first bandwidth is data associated with routing of contacts, and the second portion of the data associated with the second bandwidth is configuration data.

5. The system of claim 1, wherein the program instructions further cause the processor to:
transmit a first notification to the second enterprise prior to transmitting the portion of the identified data to the second enterprise;
wait for a second notification from the second enterprise; and
transmit the portion of the identified data in response to receipt of the second notification.

6. The system of claim 5, wherein the second notification specifies timing of transmission of data to the second enterprise, wherein the processor is configured to transmit the portion of the identified data in accordance with the specified timing.

7. The system of claim 6, wherein the second notification specifies an amount of data to be transmitted to the second enterprise, wherein the processor is configured to transmit the portion of the identified data in accordance with the specified timing and specified amount of data.

8. The system of claim 1, wherein the refraining of transmitting the portion of the data to the third enterprise is based on refusal of the data based on a determination that the data is redundant.

9. The system of claim 1, wherein the refraining of transmitting the portion of the data to the third enterprise is based on refusal of the data based on a determination of latency in the data.

10. The system of claim 1, wherein instructions that cause the processor to refrain from transmitting the portion of the data to the third enterprise include instructions that cause the processor to:
receive a request from the third enterprise; and
transmit the portion of the data to the third enterprise in response to the request.

11. The system of claim 10, wherein the request is for new data.

12. The system of claim 1, wherein the portion of the data is refrained from being transmitted to the third enterprise in response to a fourth enterprise in the federation transmitting the portion of the data to the third enterprise.

13. The system of claim 12, wherein the third enterprise is configured to select between the first enterprise and the fourth enterprise from which to receive the portion of the data, and transmit a request to the fourth enterprise instead of the first enterprise for the data.

14. The system of claim 1, wherein the second enterprise is configured to select between the first enterprise and a fourth enterprise from which to receive the portion of the data, and transmit a request to the first enterprise instead of the fourth enterprise for the data.

15. The system of claim 1, wherein the instructions further cause the processor to:
   determine access rights of the second and third federations to the portion of the data; and
   transmit the portion of the data to the second enterprise in response to determining that the second enterprise has access rights to the portion of the data; and
   refrain from transmitting the portion of the data to the third enterprise in response to determining that the third enterprise does not have access rights to the portion of the data.

16. A method for managing data flow between a plurality of enterprises in a federation comprising:
   identifying, by a processor in a first enterprise of the federation, a change in structure or capacity of the federation triggered by the admittance of a requesting entity into the federation, wherein the change generates data to be provided to the plurality of enterprises in the federation;
   identifying, by the processor, the data to be transmitted to the plurality of enterprises in the federation in response to the change; and
   throttling, by the processor, transmission of the data to the plurality of the enterprises in the federation based on rules for managing data flow to the plurality of enterprises in the federation, wherein the instructions that cause the processor to throttle transmission of the data includes instructions that cause the processor to transmit at least a portion of the data to a second enterprise of the plurality of enterprises in the federation, and refrain from transmitting the portion of the data to a third enterprise of the plurality of enterprises in the federation.

17. The method of claim 16, wherein the access rules include rules for assigning bandwidth for transmitting the identified data, the method further comprising:
   identifying, by the processor, a type of data contained in the portion of the identified data;
   identifying, by the processor, a first bandwidth allocated to the type of data based on the rules; and
   transmitting, by the processor, portion of the data to the second enterprise in accordance with the allocated first bandwidth.

18. The method of claim 17, further comprising:
   identifying, by the processor, a second bandwidth allocated to a second portion of the identified data based on the rules, wherein the second bandwidth is different from the first bandwidth; and
   transmitting, by the processor, the second portion of the identified data in accordance with the allocated second bandwidth.

19. The method of claim 16, further comprising:
   transmitting, by the processor, a first notification to the second enterprise prior to transmitting the portion of the identified data to the second enterprise;
   waiting for a second notification from the second enterprise; and
   transmitting, by the processor, the portion of the identified data in response to receipt of the second notification.

20. The method of claim 19, wherein the second notification specifies timing of transmission of data to the second enterprise, wherein the processor is configured to transmit the portion of the identified data in accordance with the specified timing.

* * * * *